United States Patent [19]
Bryg et al.

[11] Patent Number: 6,049,851
[45] Date of Patent: Apr. 11, 2000

[54] METHOD AND APPARATUS FOR CHECKING CACHE COHERENCY IN A COMPUTER ARCHITECTURE

[75] Inventors: William R. Bryg, Saratoga; Kenneth K. Chan, San Jose, both of Calif.; Eric Delano, Fort Collins, Colo.; John F. Shelton, La Selva Beach, Calif.

[73] Assignee: Hewlett-Packard Company, Palo Alto, Calif.

[21] Appl. No.: 08/196,618

[22] Filed: Feb. 14, 1994

[51] Int. Cl.[7] ........................................... G06F 9/34
[52] U.S. Cl. ..................... 711/141; 711/142; 711/143; 711/144; 711/146; 712/1; 712/32
[58] Field of Search ........................ 395/800, 425, 395/427, 468, 473, 482; 364/DIG. 1; 712/1, 32, 25, 26, 27; 711/117, 118, 119, 120, 121, 122, 123, 141, 142, 143, 144, 145, 146, 155

[56] References Cited

U.S. PATENT DOCUMENTS

| | | | |
|---|---|---|---|
| 4,977,498 | 12/1990 | Rastegar et al. | 364/200 |
| 5,025,365 | 6/1991 | Marthur et al. | 364/200 |
| 5,091,846 | 2/1992 | Sachs et al. | 395/250 |
| 5,136,700 | 8/1992 | Thacker | 395/400 |
| 5,247,648 | 9/1993 | Watkins et al. | 395/425 |
| 5,249,284 | 9/1993 | Kass et al. | 395/425 |
| 5,276,852 | 1/1994 | Lallander et al. | 395/425 |
| 5,297,269 | 3/1994 | Donaldson et al. | 395/425 |
| 5,355,467 | 10/1994 | MacWilliams et al. | 395/425 |
| 5,406,504 | 4/1995 | Denisco et al. | 364/580 |

*Primary Examiner*—Meng-Ai T. An
*Assistant Examiner*—Dzung C. Nguyen

[57] ABSTRACT

A double cache snoop mechanism in uniprocessor computer systems having a cache and coherent I/O and multiprocessor computer systems reduces the number of cycles that a processor is stalled during a coherency check. The snoop mechanism splits each coherency check, such that a read-only check is first sent to the cache subsystem., and a read-write check is sent thereafter only if there is a cache hit during the read-only check, and there is the need to modify the cache. Average processor pipeline stall time is reduced even though a cache hit results in an additional coherency check because most coherency checks do not result in a cache hit.

10 Claims, 4 Drawing Sheets

METHOD AND APPARATUS FOR CHECKING CACHE COHERENCY IN A COMPUTER ARCHITECTURE

BACKGROUND OF THE INVENTION

1. Technical Field

The present invention relates to a computer architecture, including uniprocessor architecture having a cache and a coherent input/output structure and multiprocessor architecture. More particularly, the present invention relates to maintaining cache coherency in a uniprocessor or multiprocessor computer architecture.

2. Description of the Prior Art

The input and output ("I/O") of information to a computer architecture having a cache should avoid the creation of stale data, i.e. data that is older than and/or inconsistent with related data stored at another cache location or in main memory. Thus, cache coherency should be maintained, while minimizing interference with processor operation. In some computer system architecture, I/O involves the transfer of data between an I/O device and the main system memory, which acts as an I/O buffer. In other computer systems, I/O involves data transfers from either cache or memory to and from the I/O device. These systems are referred to as coherent I/O systems because the processor cache must remain coherent in the presence of I/O traffic.

Caches can be classified either as write-through or write-back. A write-through cache is always written to along with system memory, such that system memory and cache each maintain a current copy of the information that is written, and the possibility of stale data is avoided. Information input in computer architecture using a write-through cache requires significant system overhead. For example, the system must guarantee that none of the blocks of the I/O buffer that have been designated for input are in the cache.

Write-back caches keep modified data until the data are cast out and written back to memory to make room for new data. Because a write-back cache may have the only copy of modified data, special care must be taken in the cache coherency protocol between caches and I/O systems such that the cache data can be quickly accessed and never lost.

One software solution to the stale data problem marks a buffer page as non-cacheable, and the operating system is configured to input information only to this non-cacheable page. Another software solution to this problem uses the operating system to flush the buffer addresses from the cache after an information input occurs, effectively clearing the caches. A hardware solution to the stale data problem checks the I/O addresses during information input to determine if they are in the cache. If so, the cache entries are invalidated to avoid stale data.

The protocols that are used to maintain coherency for multiple processors are referred to as cache coherency protocols. There are two classes of cache coherency protocols:

1. Directory based: The information about one block of physical memory is kept in just one location. This information usually includes which cache(s) has a copy of the block and whether that copy is marked exclusive for future modification. An access to a particular block first queries the directory to see if the memory data is stale and the real data resides in some other cache. If it is, then the cache containing the modified block is forced to return its data to memory. Then the memory forwards the data to the new requester, updating the directory with the new location of that block. This protocol minimizes interbus module (or inter-cache) disturbance, but typically suffers from high latency and is expensive to build due to the large directory size required.

2. Snooping: Every cache that has a copy of the data from a block of physical memory also has a copy of the information about the data block. Each cache is typically located on a shared memory bus, and all cache controllers monitor or snoop on the bus to determine whether or not they have a copy of the shared block.

Snooping protocols are well suited for multiprocessor system architecture that use caches and shared memory because they operate in the context of the preexisting physical connection usually provided between the bus and the memory. Snooping is preferred over directory protocols because the amount of coherency information is proportional to the number of blocks in a cache, rather than the number of blocks in main memory.

The coherency problem arises in a multiprocessor architecture when a processor must have exclusive access to write a block of memory or object, and/or must have the most recent copy when reading an object. A snooping protocol must locate all caches that share the object to be written. The consequences of a write to shared data are either to invalidate all other copies of the data, or to broadcast the write to all of the shared copies. Because of the use of write back caches, coherency protocols must also cause checks on all caches during memory reads to determine which processor has the most up to date copy of the information.

Data concerning information that is shared among the processors is added to status bits that are provided in a cache block to implement snooping protocols. This information is used when monitoring bus activities. On a read miss, all caches check to see if they have a copy of the requested block of information and take the appropriate action, such as supplying the information to the cache that missed. Similarly, on a write, all caches check to see if they have a copy of the data, and then act, for example by invalidating their copy of the data, or by changing their copy of the data to the most recent value.

Since every coherent bus transaction causes the caches to check their address tags, snooping interferes with the CPU's access to its cache regardless of the snoop result. For example, even when snooping returns a miss, the CPU is prevented from cache access because the cache is unavailable, i.e. the cache is busy checking tags to match against the snoop address. Thus, the CPU stalls or locks if it needs to access the cache while the cache is busy with a coherency check.

Snooping protocols are of two types:

Write invalidate: The writing processor causes all copies in other caches to be invalidated before changing its local copy. The processor is then free to update the data until such time as another processor asks for the data. The writing processor issues an invalidation signal over the bus, and all caches check to see if they have a copy of the data. If so, they must invalidate the block containing the data. This scheme allows multiple readers but only a single writer.

Write broadcast: Rather than invalidate every block that is shared, the writing processor broadcasts the new data over the bus. All copies are then updated with the new value. This scheme continuously broadcasts writes to shared data, while the write invalidate scheme discussed above deletes all other copies so that there is only one local copy for subsequent writes. Write broadcast protocols usually allow data to be tagged as shared (broadcast), or the data may be tagged as private (local). For further information on coherency, see J.

Hennessy, D. Patterson, *Computer Architecture: A Quantitative Approach*, Morgan Kaufmann Publishers, Inc. (1990).

In a snoopy coherence multiprocessor system architecture, each coherent transaction on the system bus is forwarded to each processor's cache subsystem to perform a coherency check. This check usually disturbs the processor's pipeline because the cache cannot be accessed by the processor while the coherency check is taking place.

In a traditional, single ported cache without duplicate cache tags, the processor pipeline is stalled on cache access instructions when the cache controller is busy processing cache coherency checks for other processors. For each snoop, the cache controller must first check the cache tags for the snoop address, and then modify the cache state if there is a hit. Allocating cache bandwidth for an atomic (unseparable) tag read and write (for possible modification) locks the cache from the processor longer than needed if the snoop does not require a tag write. For example, 80% to 90% of the cache queries are misses, i.e. a tag write is not required.

It is possible to eliminate contention between the processor pipeline and the bus snoops by implementing a dual ported cache. However, this solution requires additional hardware and interconnect, and is therefore difficult and expensive to implement. It is also known to use a second set of cache tags that are dedicated for bus snoops. These tags are nominally duplicates of the regular cache tags, but such system is difficult to maintain correctly, and is also more expensive to implement than a system not having duplicate cache tags.

Any mechanism that reduces the amount of processor stall time due to coherency checks will improve multiprocessor performance. A system implementing such mechanism in a simple and inexpensive way would be a significant advance in multiprocessor architecture design.

SUMMARY OF THE INVENTION

The invention provides a double cache snoop mechanism, i.e. a cache mechanism in which each snoop has the possibility of being sent to the cache twice. The double cache snoop mechanism disclosed herein reduces the average number of cycles that a processor is stalled or locked during a coherency check, based on the recognition that for some processor designs, the processor need not stall for as many cycles as a result of a cache coherency check if it is known that the check will not modify the cache, i.e. it will not write. The snoop mechanism splits each coherency check to a non-cache-modifying light-weight check and a cache-modifying heavy-weight check. For each coherency transaction on the system bus, a light-weight check is first sent to the cache subsystem. A heavy-weight check is sent thereafter only if there is a cache hit during the light-weight check, indicating there may be a need to modify the cache. Because most coherency checks do not result in a cache hit, the average processor pipeline stall time is reduced, even though each cache hit results in an additional coherency check.

It should be noted that a cache hit does not automatically imply that it is necessary to modify the cache tags. For example, during a read access to a line, a shared copy of the line may be requested. If that line is already in the shared state in two other caches, the snoop hits both of those caches, but it is not necessary to modify the status of the line because the line is already in the shared state.

The double snoop mechanism disclosed herein reduces processor pipeline disturbance from coherency checks without increasing cache complexity or cost. The mechanism also yields higher performance than a traditional single snoop mechanism.

DETAILED DESCRIPTION OF THE INVENTION

The invention provides a double cache snoop mechanism that performs cache coherency checks in uniprocessor computer systems having a cache and coherent I/O and in multiprocessor computer systems.

Figure 1:
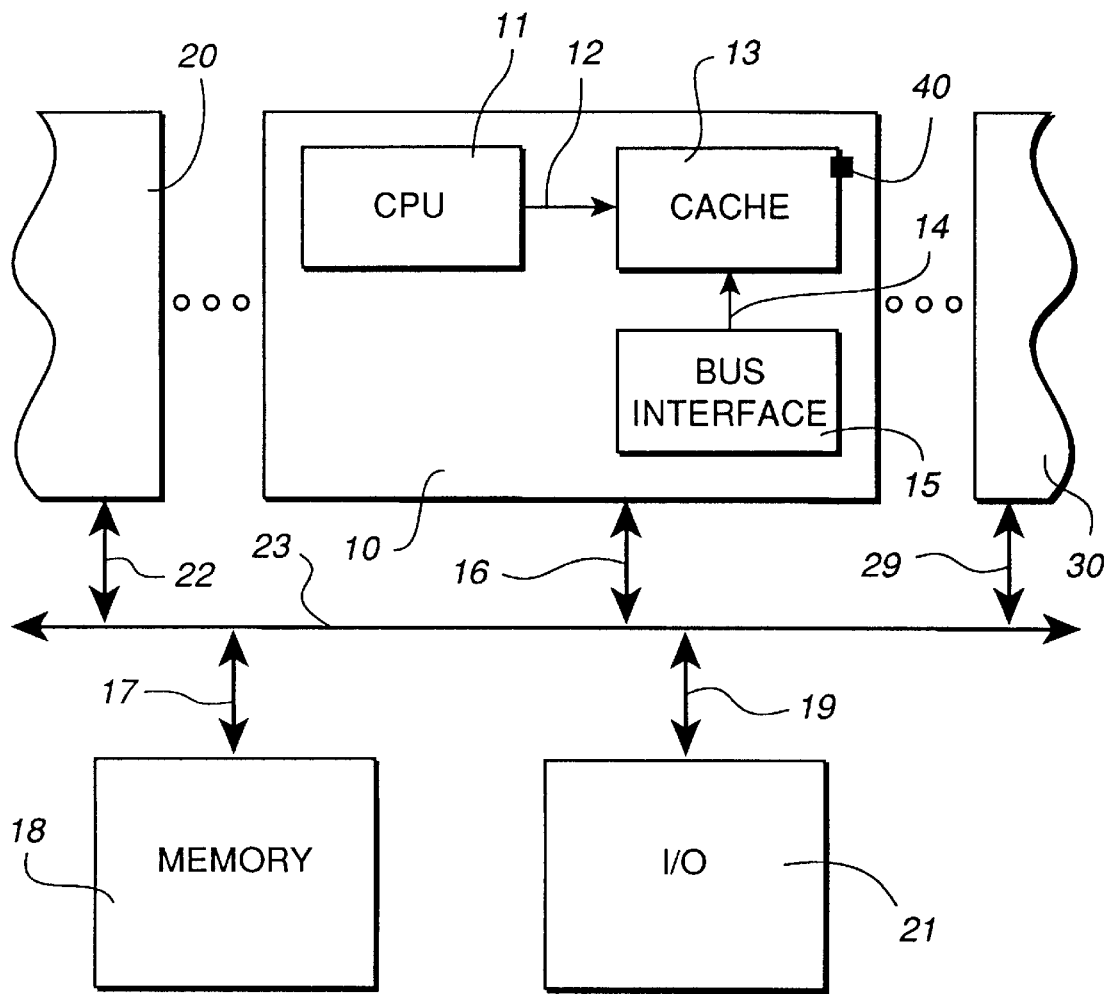
FIG. 1 is a block schematic diagram of a multiprocessor computer architecture according to the present invention.

FIG. 1 is a block schematic diagram of an exemplary multiprocessor computer architecture. In a multiprocessor computer architecture, a plurality of modules, such as processors 10, 20, 30 are coupled to a system bus 23 by bus links 16, 22, 29, respectively. Any number of processors may be used in such architecture, depending upon processor speed and operating system design. Each processor has an internal structure that includes a central processing unit ("CPU") 11 which is coupled via an internal link 12 to a processor cache memory 13. The processor cache memory includes a cache line 40 that consists of address tags, status, and data components (discussed in greater detail below). A bus interface module 15 couples the processor cache to the system bus 23 by an internal link 14 and a processor link 16. The processors are adapted to communicate with each other; with a system memory 18, which is coupled to the system bus 23 by a bus link 17; and with a system input/output ("I/O") module 21 which is coupled to system the bus 23 by a bus link 19.

It should be appreciated that the specific system and processor architecture that are described herein are discussed for purposes of example, and they are not intended to be construed as limitation upon the scope of the invention, which is defined by the claims below. The invention is well adapted for many different types of processors and multiprocessor architecture.

Whenever a coherent transaction is issued on the bus 23, each processor 10, 20, 30, acting as a third party, performs a cache coherency check using a virtual index and real address. The invention also has application to systems using physically indexed caches.

Each third party processor is responsible for signaling cache coherency status after the address cycle. The third party processor signals that its cache line 40 is in one of four states: shared, private clean (or "exclusive"), private dirty (or "modified"), or not present (or "invalid"). The requesting processor interprets the coherency status to determine how to mark the cache line, i.e. private clean, private dirty, or shared. The third party also updates its cache line state to indicate: no change, shared, or not present.

If a third party signals that it has the requested line in the private dirty state, then it initiates a cache to cache transaction at a time after the address cycle. The requesting processor discards the data received from main memory for the initial request and instead accepts the data directly from the third party in a cache to cache transfer. At the same time, the data from the third party is written to main memory. Because a multiprocessor system architecture allows multiple outstanding pipeline transactions, it is important that the processor modules be able to perform pipeline cache coherency checks to take maximum advantage of the bus bandwidth. For a discussion of a multiprocessor system architecture of the type with which the invention finds ready application, see K. Chan, T. Alexander, C. Hu, D. Larson, N. Noordeen, Y. Van Atta, T. Wylegala, S. Ziai, *Multiprocessor Features of the HP Corporate Business Servers,* Compcon Digest of Papers (February 1993).

Figure 2:
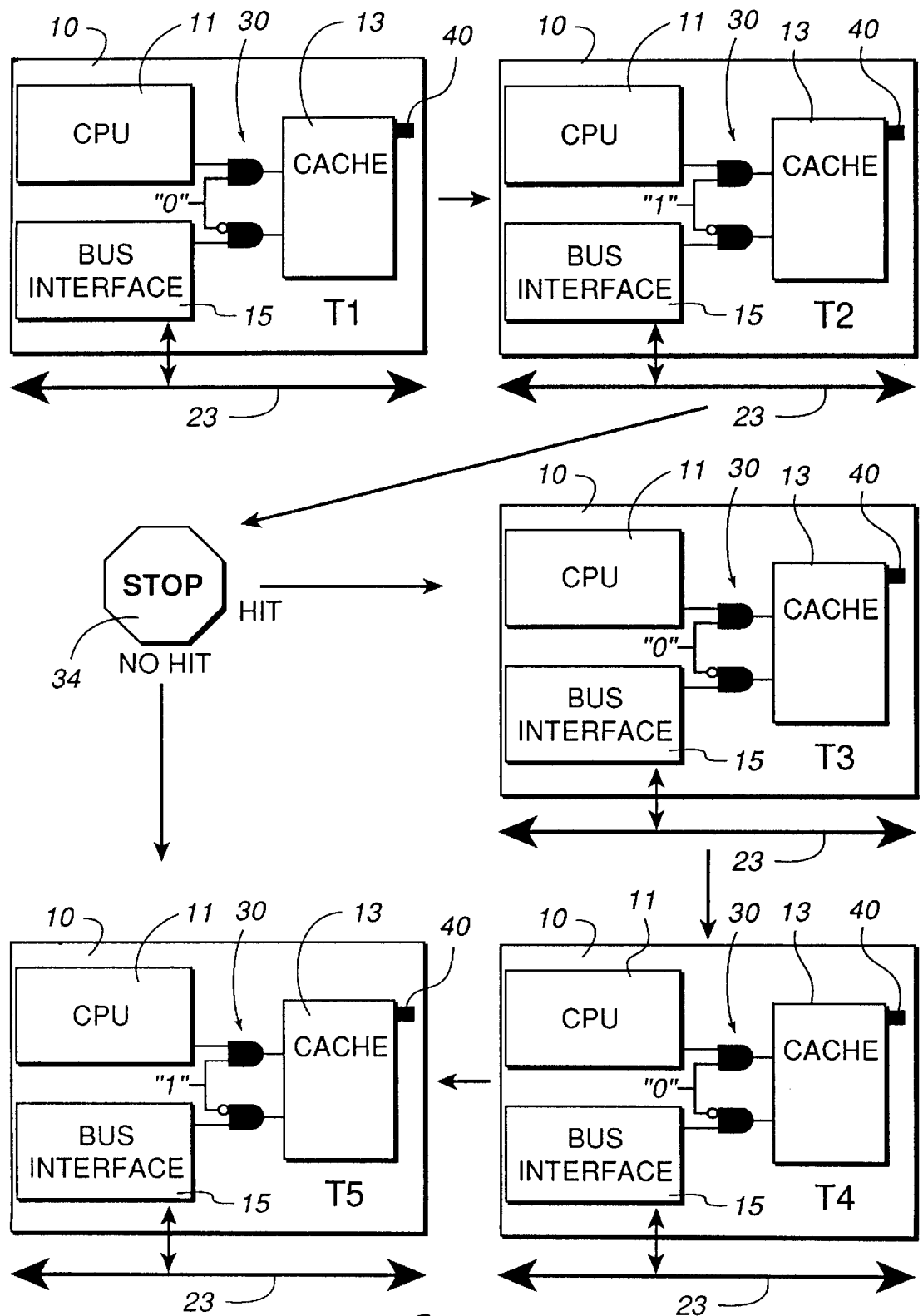
FIG. 2 is a block schematic diagram of a processor in a multiprocessor computer architecture showing a snooping sequence according to the present invention.

FIG. 2 is a block schematic diagram of a processor in a multiprocessor computer architecture showing an exemplary snooping sequence. At the start of a snoop sequence t1, a processor 10 CPU 11 is locked out from making cache accesses, as shown by a logical "0" at the input of the gating circuit 30 which inhibits propagation of the CPU signal, while passing the bus interface signal to the cache; and the processor cache 13 is then read, as shown at time t2, on behalf of the bus interface 15.

The CPU is unlocked for cache accesses, as shown by a logical "1" at the input of the gating circuit 30 for time t2. If the read does not result in a hit, then a decision is made (as indicated by the STOP sign 34) to release the processor and allow normal processor operation to proceed to the step in the process shown at time t5. If the read results in a hit, then a decision is made (as indicated by the STOP sign 34) to relock the processor (as shown at the step in the process at time t3 and as indicated by a logical "0" at the input of the gating circuit 30), reread the processor to confirm that the cache contents have not changed during the immediately preceding interval when the cache was first read t1, and write to the cache, as shown at the process step of time t4.

Thereafter, the snoop mechanism proceeds to release the processor, as shown by a logical "1" at the input of the gating circuit 30 (during the process step shown at time t5), and allow normal processor operation to continue. Instead of performing an unseparable or atomic read and write operation for each coherency check, as is the practice in the prior art, the snoop mechanism herein only performs a read operation. If and only if there is a hit, the mechanism rereads the cache and then writes to the cache if appropriate (not all hits require modification of the cache). Although a hit results in an extra read operation, i.e. the initial read only operation, and therefore impacts latency and processor stall time for each hit, because a hit is typically not expected more than about 10% of the time, the mechanism significantly reduces processor stall time during the remaining 90% of the time a coherency check is performed and a write operation is not needed.

Figure 3:
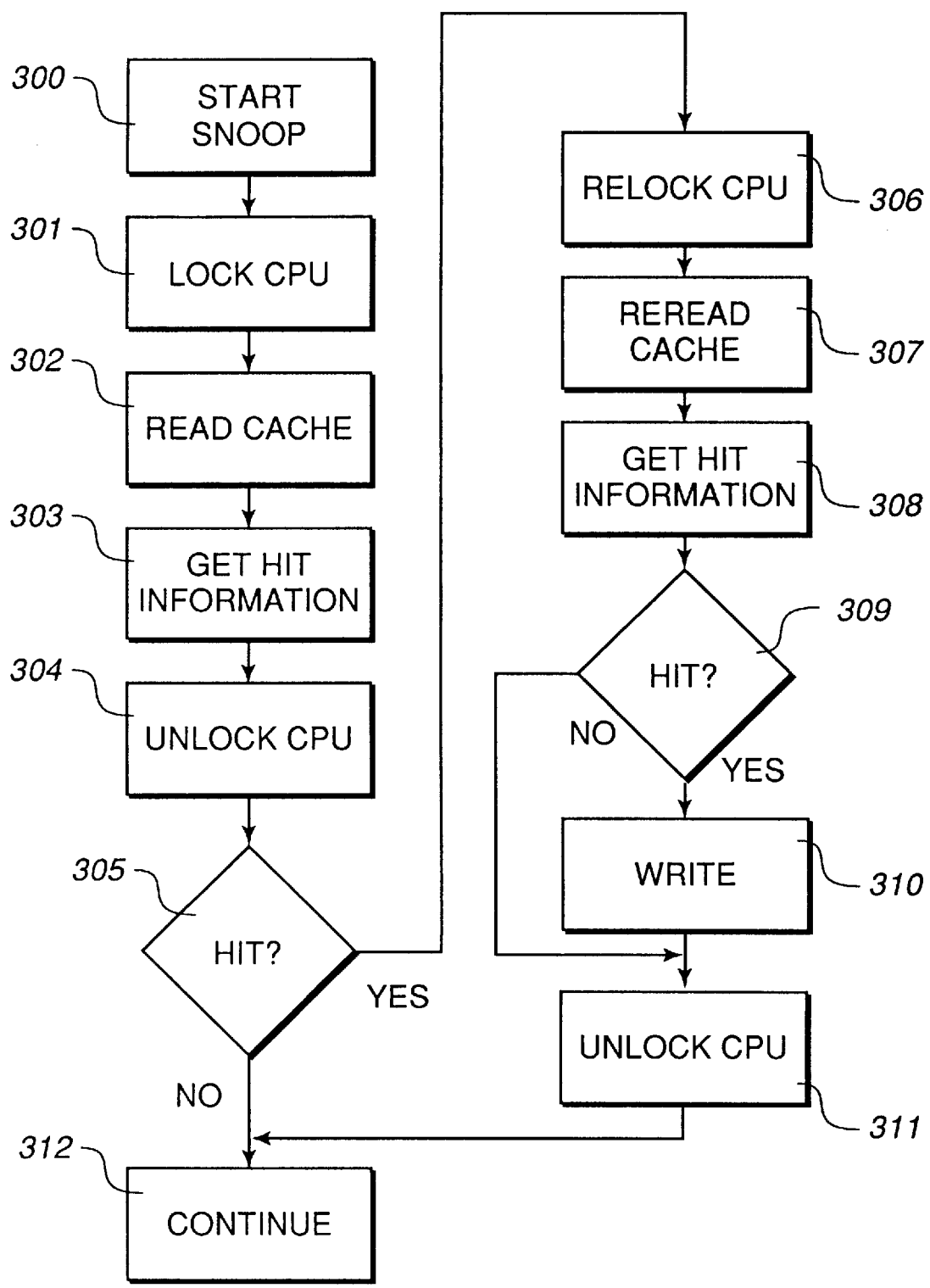
FIG. 3 is a flow diagram of a snooping sequence in a multiprocessor computer architecture according to the present invention.

FIG. 3 is a flow diagram of a snooping sequence in a multiprocessor computer architecture. In the figure, at the start of a snoop sequence (300), the CPU is locked (301) and the processor cache is read (302). The snoop sequence returns hit information (303) indicating processor cache status. The CPU is then unlocked (304). If the snoop sequence did not return a hit (305), then the processor remains unlocked and operations continues (312). If the snoop sequence returns a hit (305), then the CPU is relocked (306) and the cache is reread (307) to determine if the cache status has changed during the short interval that the processor was unlocked after the initial read. The reread returns cache hit information (308). If there is not a hit (309), then the CPU is unlocked (311) and processor operation continues (312). If the reread returns a hit (309), then the cache is written (310), after which the CPU is unlocked (311) and processor operation is allowed to continue (312).

Figure 4:
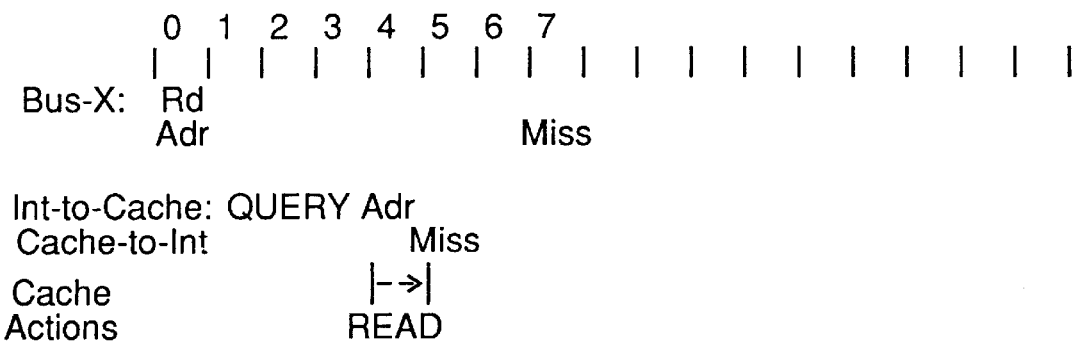
FIG. 4 is a timing diagram of a snoop that misses according to the invention.
Figure 5:
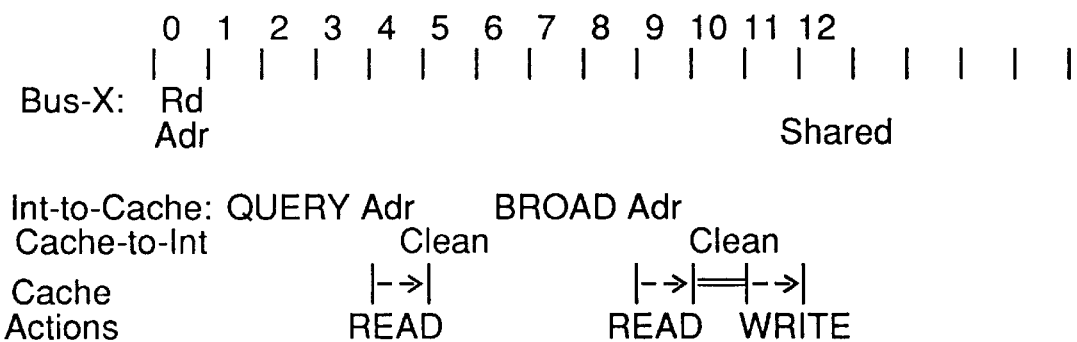
FIG. 5 is a timing diagram of a snoop that hits clean according to the invention.
Figure 6:
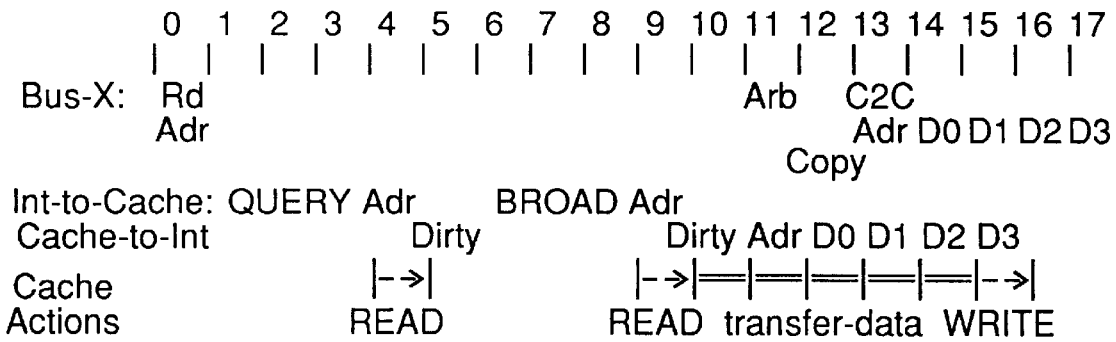
FIG. 6 is a timing diagram of a snoop that hits dirty according to the invention.

FIGS. 4, 5, 6 show the timing of an embodiment of the invention including the coherency protocol of bus 23 and actions of the bus interface 15 and cache 13 in response to bus snoops.

FIG. 4 shows a snoop that misses the cache. At time 0, a coherent read transaction is received from the bus by the bus interface. At time 2, the bus interface alerts the cache that a non-cache modifying QUERY snoop follows at time 3. At time 3, the address of the snoop is sent to the cache. At time 4, the cache checks its tags for the address sent during time 3. At time 5, the tag results are sent back to the bus interface, indicating a cache miss in this case. At time 7, that cache miss is reported back on the bus, and the snoop is complete.

FIG. 5 shows a snoop that hits the cache, which has the line in the exclusive but un-modified (clean) state. At time 0, a coherent read transaction is received from the bus by the bus interface. At time 2, the bus interface alerts the cache that a non-cache modifying QUERY snoop follows at time 3. At time 3, the address of the snoop is sent to the cache. At time 4, the cache checks its tags for the address sent during time 3. At time 5, the tag results are sent back to the bus interface, indicating a cache hit on a clean line. At time 7, the bus interface alerts the cache that a cache modifying snoop follows. At time 8, the snoop address is re-sent to the cache, this time for possible cache modification. At time 9, the cache tags are checked again. At time 10, results of the tag check is sent to the bus interface, indicating a hit on a clean line (again). The cache then modifies the tags of that line in time 11, changing it from a clean line to a shared line. At time 12, the bus interface signals on the system bus that the final status of the line has changed to shared.

FIG. 6 shows a snoop that hits the cache, which has the line in the exclusive and modified (dirty) state. At time 0, a coherent read transaction is received from the bus by the bus interface. At time 2, the bus interface alerts the cache that a non-cache modifying QUERY snoop follows at time 3. At time 3, the address of the snoop is sent to the cache. At time 4, the cache checks its tags for the address sent during time 3. At time 5, the tag results are sent back to the bus interface, indicating a cache hit on a dirty line. At time 7, the bus interface alerts the cache that a cache modifying snoop follows. At time 8, the snoop address is re-sent to the cache, this time for possible cache modification. At time 9, the cache tags are checked again. At time 10, results of the tag check is sent to the bus interface, indicating a hit on a dirty line (again). The cache then transfers the contents of the line to the bus interface from time 11 to time 15, and finally changes the status of the line to invalid at time 15. At time 12, the bus interface signals on the system bus that the snoop has hit a dirty line and that the dirty line will be later transferred to its requestor, which happens from time 13 thru time 17.

Although the invention is described herein with reference to the preferred embodiment, one skilled in the art will readily appreciate that other applications and equivalents may be substituted for those set forth herein without departing from the spirit and scope of the present invention. For example, the snoop mechanism herein can be provided in a coherency check system that includes multiple user or automatically selectable snoop mechanisms, where snoop mechanism selection is based upon system optimization. Additionally, a state bit may be provided, for example as set by a flip-flop, to disable the double snoop mechanism when the environment in which the invention is used is one in which a significant amount of data sharing is expected, or where the first level of snoop checking is performed by an interface circuit having duplicate cache tags, such that only snoops that will hit are forwarded to the circuit embodying the invention. The state bit may be user selected, software selected, or automatically selected based upon a statistical determination of cache activity. Accordingly, the invention should only be limited by the Claims included below.

We claim:

1. An apparatus for checking cache coherency in a computer architecture having a system memory interconnected by a system bus to at least two modules, at least one of said modules having an associated cache memory for storing cache contents therein, comprising:

a cache address tag associated with each cache for indicating said cache contents status;

a bus interface associated with each module for receiving requests to check cache coherency, and for forwarding said requests to said cache; said bus interface forwarding a first, read-only request to said cache, followed by a second read-write request that is forwarded to said cache if and only if said first read-only request indicates that said cache address tag matches an address of said request to check cache coherency and said request to check cache coherency requires said cache to be modified as a result of any of invalidation, copying out, or changing from clean to shared status; and each module including a lock for interrupting access to said cache only during a read-only request and a subsequent read-write request pursuant to a cache coherency check.

2. The apparatus of claim 1, said cache tag further comprising:

means for indicating as appropriate any of modified status, wherein said cache contents are more current than those of said system memory; exclusive status, wherein said cache contents cannot be shared between modules; shared status, wherein said cache contents are shared between modules; and invalid status, wherein copies of said cache contents are not maintained at any other modules.

3. The apparatus of claim 2, further comprising:

a requesting module, said requesting module having a requesting module cache, said requesting module forwarding said cache coherency check to said other modules;

said other modules comprising third party modules adapted to respond to said cache coherency check by forwarding associated cache status information to said requesting module, said third party module cache status information adapted to provide replacement information for said requesting module cache, if information contained in said requesting module cache indicates that said cache address tag matches an address of said request, and said request requires the cache to be modified; and to receive replacement information from said requesting module cache, if information contained in said third party module cache is to be modified.

4. The apparatus of claim 1, further comprising:

means for disabling cache coherency checks where a significant level of data sharing occurs.

5. The apparatus of claim 1, further comprising:

means for disabling said read-only cache coherency checks when said cache receives a substantial percentage of snoops that require said cache to be modified.

6. A method for checking cache coherency in a computer architecture having a system memory interconnected by a system bus to at least two modules, each of said modules having an associated cache memory, comprising the steps of:

locking a cache that is to be subjected to a coherency check to prevent a module from accessing the cache during the coherency check;

performing a read-only cache coherency check to determine if said cache contains current or stale data;

unlocking said cache after said read-only cache coherency check;

relocking said cache and performing a subsequent read-write cache coherency check only if said read-only cache coherency check indicates that said cache contains an address tag that matches an address of said read-only cache coherency check, wherein said cache is reread to determine if the cache status has changed during the interval that the cache was unlocked after the read-only cache coherency check, and wherein said cache is then written to so as to update said cache tag contents; and unlocking said cache after said read-write coherency check.

7. The method of claim 6, further comprising the step of:

indicating for said cache with a cache tag as appropriate any of modified status, wherein said cache contents are more current than those of said system memory; exclusive status, wherein said cache contents cannot be shared between modules; shared status, wherein said cache contents are shared between modules; and invalid status, wherein copies of said cache contents are not maintained at any other modules.

8. The method of claim 7, further comprising the steps of:

forwarding said cache coherency check to third party modules with a requesting module;

responding to said cache coherency check by forwarding associated cache status information to said requesting module from said third party modules, said third party module cache status information adapted to provide replacement information for said requesting module cache, if information contained in said requesting module cache is stale; and to receive replacement information from said requesting module cache, if information contained in said third party module cache is stale.

9. The method of claim 6, further comprising the step of:

disabling cache coherency checks where a significant level of data sharing occurs.

10. The method of claim 6, further comprising the step of:

disabling read-only cache coherency checks when said cache receives a substantial percentage of snoops that require said cache to be modified.

* * * * *